US008572277B2

(12) United States Patent
Morris et al.

(10) Patent No.: US 8,572,277 B2
(45) Date of Patent: *Oct. 29, 2013

(54) SELF-POLICING, RATE LIMITING ONLINE FORUMS

(75) Inventors: Harry W. Morris, Reston, VA (US);
Eric Bosco, Arlington, VA (US); David Lowell Lippke, Herndon, VA (US);
Colin Anthony Steele, Leesburg, VA (US)

(73) Assignee: Facebook, Inc., Menlo Park, CA (US)

( * ) Notice: Subject to any disclaimer, the term of this patent is extended or adjusted under 35 U.S.C. 154(b) by 195 days.

This patent is subject to a terminal disclaimer.

(21) Appl. No.: 12/574,989

(22) Filed: Oct. 7, 2009

(65) Prior Publication Data
US 2010/0138512 A1 Jun. 3, 2010

Related U.S. Application Data

(63) Continuation of application No. 10/876,603, filed on Jun. 28, 2004, now Pat. No. 7,613,779, which is a continuation of application No. 09/968,539, filed on Oct. 2, 2001, now Pat. No. 6,826,618, which is a continuation of application No. 09/076,484, filed on May 13, 1998, now Pat. No. 6,339,784.

(60) Provisional application No. 60/047,235, filed on May 20, 1997.

(51) Int. Cl.
G06F 11/00 (2006.01)
(52) U.S. Cl.
USPC .......... 709/235; 709/224; 709/225; 709/232; 709/233; 709/206

(58) Field of Classification Search
USPC .......... 709/218, 232–235, 204–206, 224–226
See application file for complete search history.

(56) References Cited

U.S. PATENT DOCUMENTS

| 4,707,832 | A | 11/1987 | Glenn et al. |
| 5,265,221 | A | 11/1993 | Miller |
| 5,363,507 | A | 11/1994 | Nakayama et al. |
| 5,423,038 | A | 6/1995 | Davis |
| 5,457,687 | A | 10/1995 | Newman |

(Continued)

OTHER PUBLICATIONS

"Minnesota Politics Forum—description and participation guidelines", Mar. 15, 1997, XP002405628 available on Sep. 11, 2006.

(Continued)

*Primary Examiner* — Kenneth R Coulter
(74) *Attorney, Agent, or Firm* — Keller Jolley Preece (57) ABSTRACT

A method and means for self-policing and automatically rate-limiting multiple-user online forums. The preferred embodiment of the invention includes a set of rules that permit users to censure other users. A censured user has one or more "privileges" (which may include access to the online computer system or the effective message rate of a communications connection) taken away or diminished; the privilege is gradually restored if the censured user behaves. The censuring participant and other pertinent participants are notified of the effect of the censuring on the censured user. In another aspect of the invention, the online computer system automatically tracks the rate at which a user sends certain types of messages, and can message rate limit a user who uses too many system resources by sending a large number of messages in rapid succession.

20 Claims, 4 Drawing Sheets

(56) References Cited

U.S. PATENT DOCUMENTS

| | | | |
|---|---|---|---|
| 5,548,533 A | 8/1996 | Gao et al. | |
| 5,634,040 A | 5/1997 | Her et al. | |
| 5,668,953 A | 9/1997 | Sloo | |
| 5,689,641 A | 11/1997 | Ludwig et al. | |
| 5,701,340 A | 12/1997 | Zwick | |
| 5,704,047 A | 12/1997 | Schneeberger | |
| 5,706,279 A | 1/1998 | Teraslinna | |
| 5,742,587 A | 4/1998 | Zornig et al. | |
| 5,768,527 A | 6/1998 | Zhu et al. | |
| 5,799,002 A * | 8/1998 | Krishnan | 370/234 |
| 5,825,750 A | 10/1998 | Thompson | |
| 5,862,325 A | 1/1999 | Reed et al. | |
| 5,878,027 A | 3/1999 | Schmidt | |
| 5,895,450 A | 4/1999 | Sloo | |
| 5,907,324 A | 5/1999 | Larson et al. | |
| 5,941,947 A | 8/1999 | Brown et al. | |
| 5,958,006 A | 9/1999 | Eggleston et al. | |
| 5,987,504 A | 11/1999 | Toga | |
| 5,999,932 A | 12/1999 | Paul | |
| 6,029,043 A | 2/2000 | Ho et al. | |
| 6,044,260 A | 3/2000 | Eaton et al. | |
| 6,052,709 A | 4/2000 | Paul | |
| 6,052,723 A | 4/2000 | Ginn | |
| 6,072,942 A | 6/2000 | Stockwell et al. | |
| 6,076,100 A | 6/2000 | Cottrille et al. | |
| 6,085,241 A | 7/2000 | Otis | |
| 6,088,736 A | 7/2000 | Manning et al. | |
| 6,101,531 A | 8/2000 | Eggleston et al. | |
| 6,167,434 A | 12/2000 | Pang | |
| 6,266,664 B1 | 7/2001 | Russell-Falla et al. | |
| 6,336,133 B1 * | 1/2002 | Morris et al. | 709/204 |
| 6,339,784 B1 * | 1/2002 | Morris et al. | 709/204 |
| 6,381,649 B1 | 4/2002 | Carlson | |
| 6,725,249 B2 | 4/2004 | Sidi et al. | |
| 6,826,618 B2 * | 11/2004 | Morris et al. | 709/229 |
| 7,613,779 B2 * | 11/2009 | Morris et al. | 709/206 |
| 8,140,703 B2 * | 3/2012 | Morris et al. | 709/233 |
| 2002/0046243 A1 | 4/2002 | Morris et al. | |
| 2002/0052919 A1 * | 5/2002 | Morris et al. | 709/205 |

OTHER PUBLICATIONS

*Allowing controlled SMTP relaying in Sendmail 8.9*, (2 pages), entered on Oct. 7, 2009.

*Anti-Spam Configuration Control*, (5 pages), entered on Oct. 7, 2009.

*Anti-Spam Provisions in Sendmail 8.8*, (4 pages), entered on Oct. 7, 2009.

Chip Morningstar; *The Lessons of Lucasfilm's Habitat*; Sep. 1, 1998; 15 pages; 1990.

Eric Allman, *Sendmail™ Installation and Operation Guide Version 8.310 for Sendmail Version 8.10*, Sendmail, Inc., (84 pages), entered on Oct. 7, 2009.

European Search Report for EP 01 20 1844, entered on Oct. 7, 2009.

Howard Rheingold; *The Virtual Community* (Homesteading on the Electronic Frontier); 24 pages; 1998.

J. Berkman; "Nonviolent Crowd Control"; *Proceedings of the ACM SIGUUCS 1993 User Services Conferenc XXI*; Nov. 7-10, 1993; San Diego, CA pp. 173-178.

J. Johnson-Eiolola et al.; "Policing Ourselves: Defining the Boundaries of Appropriate Discussion in Online Forums"; *Computers and Composition*, vol. 13, No. 3; pp. 269-294; 1996.

Jennifer Chung et al., "Democratic Structures in Cyberspace," pp. 1-107, Dec. 1998.

Jennifer L. Mnookin, MIT; "Bodies, Rest & Motion: Law and Identity in LambdaMOO," Virtue and Virtuality Conference, pp. 1-8, Apr. 1996.

LANtastic, Version 3.0; User's Manual; pp. 6-8, 156-158; 1990.

Mark Durham, *Spam Control in 8.10*, (3 pages), entered on Oct. 7, 2009.

Paul Boutin, *RFC 2476: Message Submission Agent*, (3 pages), entered on Oct. 7, 2009.

Paul Boutin, *RFC 2554: SMTP Authentication*, (4 pages), entered on Oct. 7, 2009.

Pavel Curtis; LambdaMOO Help Database; pp. 1-193; Jun. 1993.

PC Magazine; LANtastic; May 29, 1990.

Randal F. Farmer; *Habitat Anecdotes*; Fall 1998.

*Relaying Denied/Allowed (in sendmail 8.8/8.9)*, Last Update Feb. 11, 2000, (2 pages).

rfc2222, J. Myers, *Simple Authentication and Security Layer (SASL)*, (16 pages), Oct. 1997, The Internet Society (1997).

rfc2554, J. Myers, *SMTP Service Extension for Authentication*, (11 pages), Mar. 1999, The Internet Society (1999).

Tom Lichty; "The Guide Pager"; *The Official America Online for Windows 95 Tour Guide*; 1996, USA; pp. 238-239.

UNIX Shutdown command; Jul. 1990.

*Using SMTP Auth in Sendmail 8.10*, (2 pages), Mar. 27, 2000.

U.S. Appl. No. 09/968,540, mailed Oct. 4, 2002, Office Action.

U.S. Appl. No. 09/968,540, mailed Jul. 3, 2003, Office Action.

U.S. Appl. No. 09/968,540, mailed Apr. 20, 2006, Office Action.

U.S. Appl. No. 09/968,540, mailed Jul. 22, 2008, Office Action.

U.S. Appl. No. 09/968,540, mailed Nov. 30, 2011, Notice of Allowance.

* cited by examiner

SELF-POLICING, RATE LIMITING ONLINE FORUMS

This application is a continuation of U.S. patent application Ser. No. 10/876,603, filed Jun. 28, 2004, now U.S. Pat. No. 7,613,779, which is a continuation of U.S. patent application Ser. No. 09/968,539, filed Oct. 2, 2001, now U.S. Pat. No. 6,826,618, which is a continuation of U.S. patent application Ser. No. 09/076,484, filed May 13, 1998, now U.S. Pat. No. 6,339,784, which claims priority from provisional application No. 60/047,235, filed May 20, 1997, the entire contents of the prior applications being incorporated herein by reference.

BACKGROUND

1. Technical Field

This invention relates to distributed computer services, particularly computer services having online forums.

2. Background Information

An online forum is a communications interchange in which people may communicate with others through successive electronic transmissions between respective computer systems. An online forum, or any other type of distributed computer services may be implemented on a distributed computer system such as that shown in FIG. 1. Forum participants (equivalently, users of the computer services) typically are scattered across a large geographical area and communicate with one or more central server systems 100 through respective client systems 102 (e.g., a personal or laptop computer). In practice, the server system 100 typically will not be a single monolithic entity but rather will be a network of interconnected server computers, possibly physically dispersed from each other, each dedicated to its own set of duties and/or to a particular geographical region. In such a case, the individual servers are interconnected by a network of communication links, in known fashion. One such server system is "America Online" from America Online Incorporated of Virginia.

Figure 1:
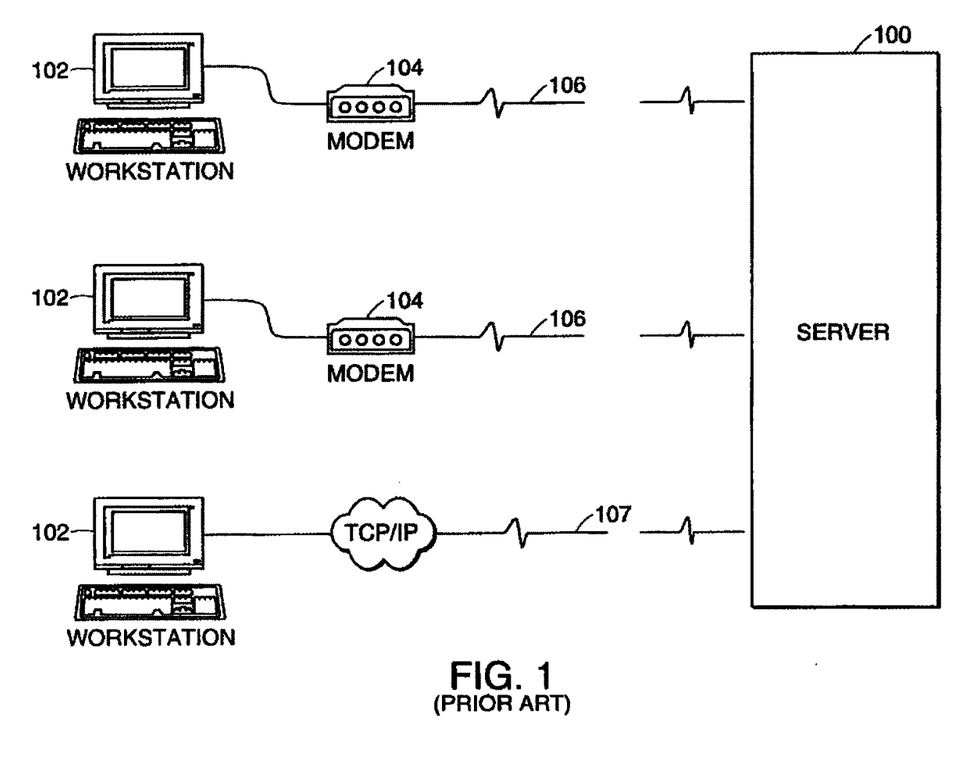
FIG. 1 shows a prior art distributed computer system of the type used for providing online computer services.

Each client system 102 runs client software that allows it to communicate in a meaningful manner with corresponding software running on the server system 100. The client systems 102 communicate with the server system 100 through various channels, such as a modem 104 connected to a telephone line 106 or a direct Internet connection using a transfer protocol such as TCP/IP (Transfer Control Protocol/Internet Protocol). The server system 100 is responsible for receiving input from the client systems 102, manipulating the collective body of input information (and possibly information from other sources) into a useful format, and retransmitting the formatted information back to one or more clients 102 for output on an output device, such as a display screen.

Figure 2:
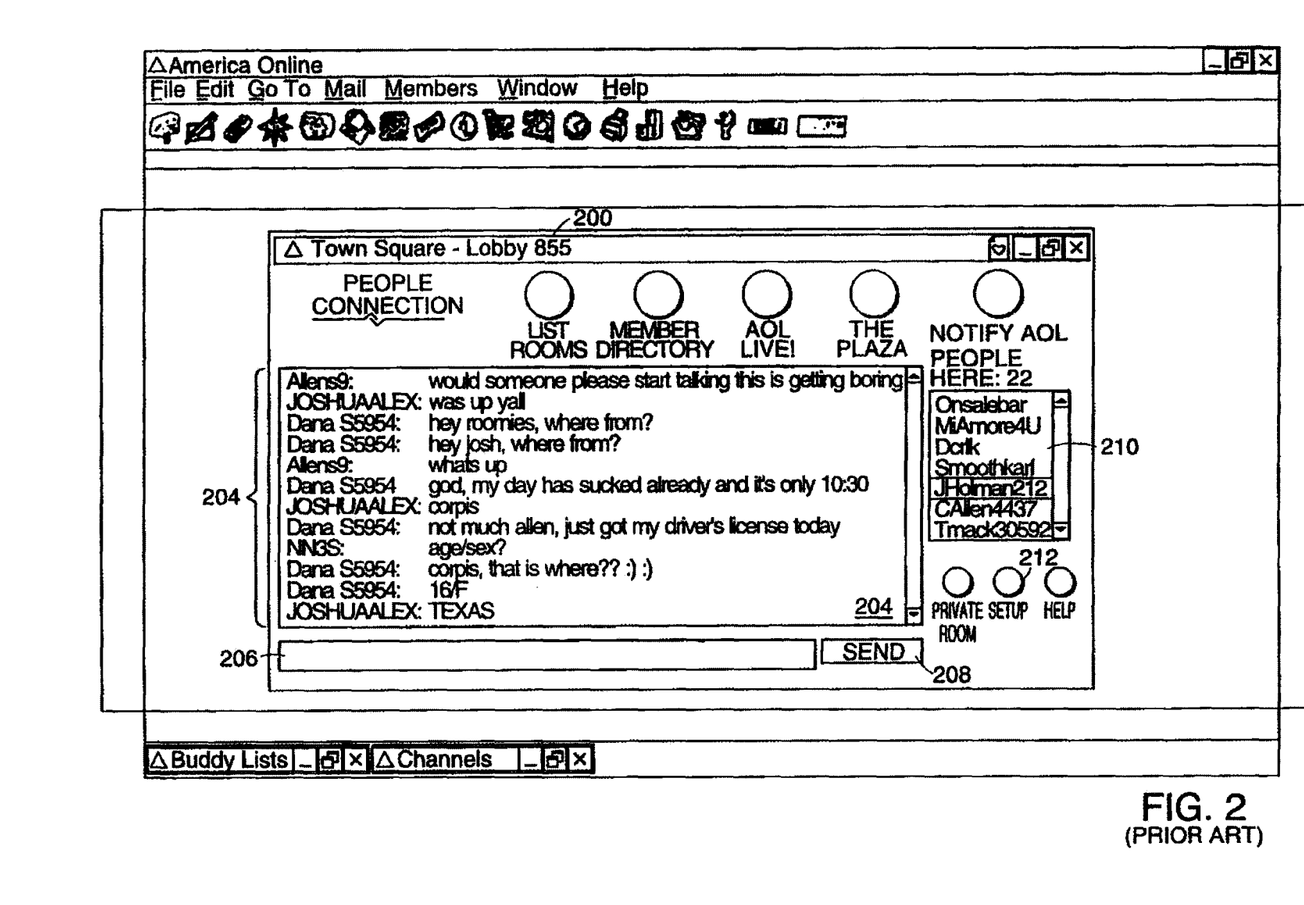
FIG. 2 is a screen shot showing an example of a prior art online computer forum.

Referring to FIG. 2, one type of forum is a "chat room" 200, in which the various participants 204 (e.g., "Allens9," "JOSHUAALEX," etc.) may enter text which appears in a scrolling text window 202 on each participant's computer display screen. In the example in FIG. 2, the chat room 200 has 22 participants whose identities (or "screen names") are listed in a scrolling window 210. A participant 204 may respond to the comment of another participant 204 by entering a line of text in an edit box 206 and activating (e.g., by clicking with a pointer device, such as a mouse) a SEND button 208. In response, the text in the scrolling text window 202 scrolls upwards and the newly entered line of text is displayed at the bottom of the scrolling text window 202. In the illustrated example, the last participant to enter a comment was JOSHUAALEX, who typed "TEXAS."

The chat room 200 shown in FIG. 2 is "public", meaning that it has multiple participants who were placed in the chat room by the computer-service provider and who most likely never have met or conversed with one another before. A comment by a participant in a public forum may be seen by all of the participants of the chat room. If a participant desires some privacy, that participant may "open" and enter a "private" chat room (for example, by clicking on a SETUP button 212), and thereafter invite one or more other participants to enter the private chat room. Once in a private forum, participants may communicate with one another without fear that uninvited participants will be able to see their comments.

When a participant in a forum, whether public or private, makes a comment that others in the forum regard as offensive, in poor taste, wildly incorrect, or otherwise objectionable, the offending participant most likely will be "flamed" by one or more of the other participants. A "flame" is a reprimand or other stringent response directed at the offending party. One purpose behind flaming another participant is to dissuade the offender, through embarrassment or intimidation, from making further objectionable comments. In this manner, if the offending user chooses to curb his or her behavior in response to the flaming, a forum may be crudely regulated or "policed" by the forum's participants. However, the offending participant may continue to behave in an objectionable manner. Further, a participant who overly "flames" other participants may also be objectionable. Accordingly, participant policing of forums does not always work well. In such cases, offended participants may drop out of "flame-filled" forums, and/or the online service must devote resources to actively police problematic participants.

Other objectionable behavior includes sending one or more messages to "spoof" other users as to the sender's identity in order to try to get confidential information (e.g., credit card numbers or passwords) sent in response (sometimes called "password fishing").

Another problem that can arise in online systems is "resource hogging", where a participant uses features such as broadcast or multi-cast messaging to send a large number of messages to other users in a short period of time (sometimes called "spamming"). Such resource hogging deprives other users of server resources, and can slow, an online system response time to undesirable levels.

Accordingly, the inventor has determined that there is a need for a better way to police recalcitrant participants in online forums and to reduce spamming. The present invention provides a method and means for accomplishing this goal.

SUMMARY

The invention provides a method and means for self-policing and automatically rate-limiting multiple-user online forums. The preferred embodiment of the invention includes a set of rules that permit users to censure other users. A censured user has one or more "privileges" (which may include access to the online computer system or the effective message rate of a communications connection) taken away or diminished; the privilege is gradually restored if the censured user behaves. The censuring participant and other pertinent participants are notified of the effect of the censuring on the censured user. In another aspect of the invention, the online computer system automatically tracks the rate at which a user sends certain types of messages, and can message rate limit a user who uses too many system resources by sending a large number of messages in rapid succession. The amount of rate limiting may be a function of the amount of censure that has been applied to the user being limited.

Advantages of this invention may include one or more of the following. The techniques described here enable a multiple-user online service (e.g., a chat room or other forum) to be self-policing. Access to the computer service for a particular user is automatically regulated by the computer based on input from other users concerning the conduct of the user under consideration, or based on the message rate of a user. Users of a computer-based system have the ability to sanction a misbehaving user and thereby have the offending user's access to the system denied or curtailed. Unlike the conventional "flaming" approach to policing, which typically fails because it relies on the misbehaving user curbing his or her own behavior or results in retaliatory "flaming", the policing techniques described here are based on predetermined rules and operate automatically in response to votes cast by other users of the computer system. The offending user has no choice in the matter once he or she chooses to misbehave. Because the operation of these policing techniques are automatic, the computer-based service provider need not expend personnel time and resources to police public forums, direct user communications, and the like.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

The prospect of millions of concurrent users of an online computer system puts great pressure on the ability of the system provider to police abusive participants. Accordingly, the invention provides a self-policing online environment that makes participants responsible for their behavior. That is, other participants can express an opinion about that behavior, and have that opinion affect the offending user in a negative way and be "visible" to other participants. Providing such a self-policing user feedback mechanism lowers the cost of providing online services to users and provides a more "user-friendly" environment for participants.

In another aspect of the invention, the online computer system automatically tracks the rate at which a user sends certain types of messages, and can "rate limit" a user who "hogs" too many system resources by sending a large number of messages (or messages of selected types) in rapid succession.

Participant Self-Policing

Figure 3:
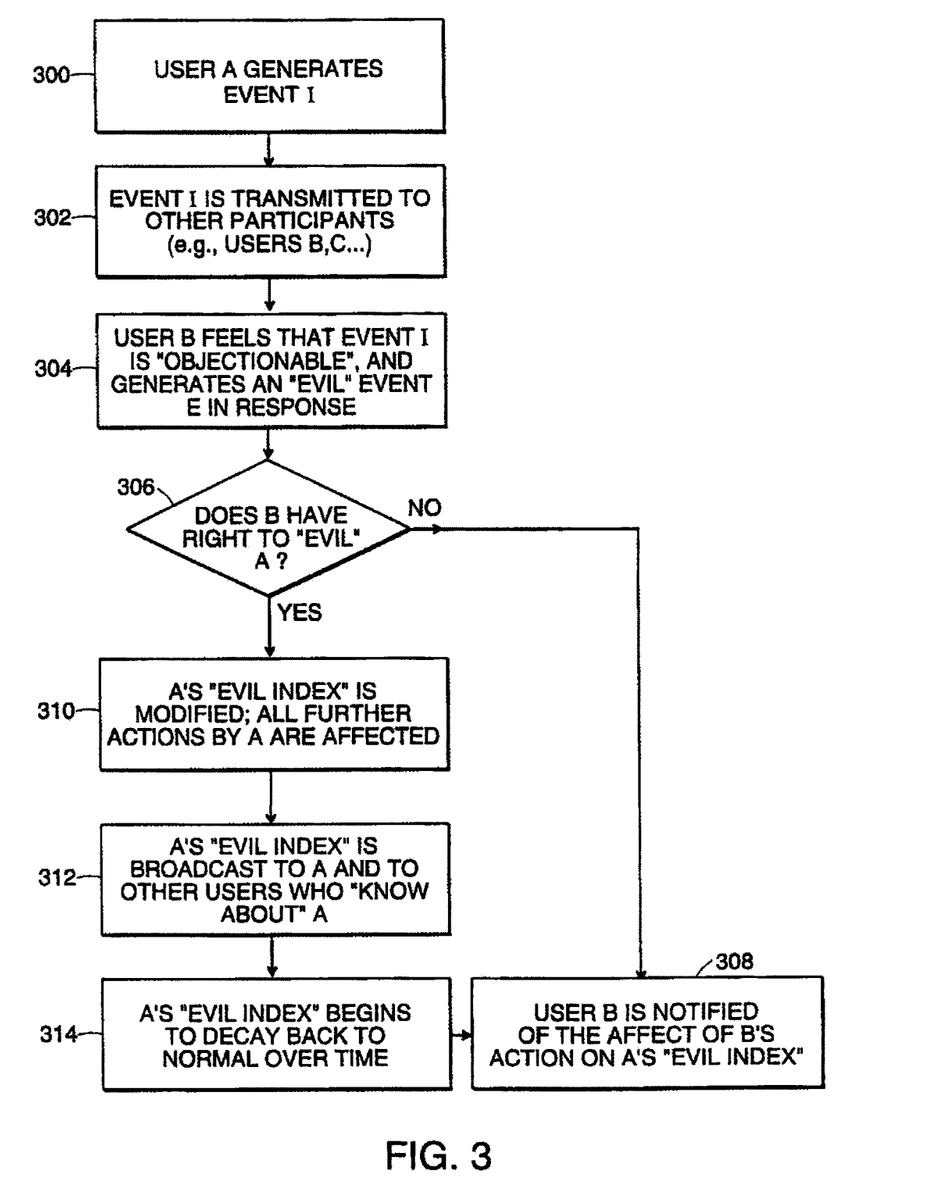
FIG. 3 is a flowchart of a basic embodiment of the self-policing aspect of the invention.

FIG. 3 is a flowchart of a basic embodiment of the self-policing aspect of the invention. Initially, user A generates an event I, such as a message (STEP 300). Event I is transmitted to some number of other participants, such as users B and C in a public forum on an online computer system (STEP 302). However, event I may be a direct communication between user A to user B, such as by use of the Instant Message™ feature of the America Online computer service. User B may feel that event I is "objectionable" or "evil" (a subjective decision by B), and therefore generates a "vote" against the behavior of user A by sending a special type of response message—an "evil" event E (STEP 304). In the preferred embodiment, a user cannot "evil" another participant except in response to a message from the participant, or otherwise in cases where the participant's actions effect the user doing the "eviling." In order to reduce retaliation, users cannot "evil" other participants directly in response to being "eviled".

The online system receives event E and checks a database to see whether user B has the right to "evil" user A (STEP 306). For example, this step can limit users who themselves have been restricted from "eviling" other users.

If user B does not have the right to "evil" user A, then user B is notified of the affect of user B's action on user A's "evil index"—a value of how restricted user A is with respect to use of resources on the online system (STEP 308). In this case, user B's action has no affect on user A.

If user B does have the right to "evil" user A, then user A's "evil index" is modified by a suitable amount, which will affect further actions by user A (STEP 310), as described below. The amount of modification can be based on the past behavior of user A, or of users A and B. The amount of modification may also depend on the type of "eviling" asserted by user B. For example, user B may wish to assert an "eviling" event E anonymously rather than be identified. Anonymous "eviling" may be accorded lesser weight. That is, an anonymous "eviling" response may count as fewer evil "votes" than it would if the eviling user's identity was revealed. In one embodiment, an "eviling" user may set up an automatic "eviling" response to all communications from another specific user. In this case, the effect of the "eviling", which is intended to discourage communication from the specific user, is given very low weight (equivalently, counts as very few evil "votes") because of its automatic invocation.

User A's "evil index" is "broadcast" to other users who "know about" user A (STEP 312). For example, such users might be all of the participants in a private chat room, or all visitors to a public chat room. In one embodiment, a modified "evil index" is reported to each user in a current chat room's user list and to each user who has the "eviled" users on his or her "buddy list" (described in co-pending U.S. patent application Ser. No. 08/803,692, filed Feb. 24, 1997, entitled "User Definable On-line Co-user Lists", hereby incorporated by reference). Thus, an "eviled" user is publicly chastised.

Thereafter, user A's "evil index" begins to gradually "decay" back to normal over time (STEP 314). Such decay may be linear, exponential, step-wise, or some other function. Meanwhile, user B is notified of the affect of user B's action on user A's "evil index" (STEP 308). In this case, user B's action has had an affect on user A.

Some of the steps noted above may be done in different order without substantially changing the effect of the process. For example, STEPS 312, and 314, and 308 may be performed in different order.

A basic "penalty" for having a non-normal "evil index" is denial of access to a forum or the online service until the user's "evil index" has decayed back to normal. In a more refined embodiment, a user's "evil index" affects a rate limit which governs a user's ability to send (and/or receive) messages. This feature allows other participants to "evil" a user who "flames" or "spams" them, and thus reduce the rate at which the recalcitrant user can send and/or receive messages. A description of rate limiting is set forth below.

A server database (which may be centralized or distributed) stores a user's "evil index". A user's "evil index" can be maintained in a user-record as a global total, or by forum, or both. The value of each "evil index" can be used to control the user's ability to log on to the online computer system or access selected forums, and/or the effective rate of message or file transmissions.

Other rules may applied in different embodiments. For example, the following rules can be implemented:

A user must be in a forum (e.g., a chat room, but including direct communication between users, such as the Instant Message™ feature of the America Online computer service) for a specified amount of time before being allowed to "evil" another user in that forum; this reduces "hit-and-run flaming". The minimum amount of time may vary from forum to forum, and from user to user (e.g., a forum "sysop" may be immune to "eviling"). A user's user-record in the server database thus would record a time-of-entry for a forum. For example, a user's time-of-entry to a forum would be compared to the current time in STEP 306 of FIG. 3 to determine if the user had the right to "evil" another participant.

A user must be in a forum for a specified amount of time before being allowed to "evil" another user who has been in that forum for a longer period of time. For example, a user's time-of-entry to a forum would be compared to the time-of-entry of another participant in STEP 306 of FIG. 3 to determine if the user had the right to "evil" that other participant. The specified amount of time may vary from forum to forum, and from user to user.

A user's eviling response may be accorded increased weight (equivalently, counted as extra "evil" votes) based on the "seniority" of the "eviling" user. Each additional unit of time spent in a forum could enhance a user's "seniority," thereby allowing long term user's more "eviling" power than new-corners. That is, being "eviled" by an "old-timer" can have a greater than normal affect on modification of a chastised user's "evil index" in STEP 310 of FIG. 3. A user's user-record in the server database thus would record a total-time-of-access for each forum, which could be a "lifetime" total (such that users who had belonged to the online computer service for longer periods would have greater "eviling" power than relatively new subscribers to the service), a running total for a selected period of time, or a session total. The time period for accumulating extra votes and the "eviling" value of extra votes may vary from forum to forum, and from user to user.

A user may be limited in the number of "eviling" votes that can be cast in any one online session or time period (e.g., a day or week). A user's user-record in the server database thus would record the number of "eviling" votes cast globally or by forum. For example, a user's number of previous "eviling" votes cast could be examined in STEP 306 of FIG. 3 to determine if the user had the right to "evil" another participant.

The amount of modification of a user's "evil index" in STEP 310 of FIG. 3 after being "eviled" is preferably non-linear, so that the first few times a user is "eviled" has little effect (and possibly no effect until some threshold level of accumulated "eviling" votes from several participants are asserted against the user) on the user's "evil index" (everyone makes a few mistakes). However, for subsequent times that a user is "eviled", the user's "evil index" preferably is modified to a much greater degree, increasing the penalty for recidivism. The determination of how much to modify a user's "evil index" can be based on the user's global "evil index" (i.e., a "rap sheet" evaluation) or forum "evil index" (i.e., a "fresh start" approach). A user's user-record in the server database would thus record the number of times the user has been "eviled", either globally or by forum, for example. The recorded number might be a "lifetime" total or a running total for a selected period of time. The amount of "evil index" modification may also vary from forum to forum, and from user to user.

As an example, each user may be given an initial "evil index" of 100. A first "offense" may reduce that value to 95; a second "offense" reduces the value to 85; third and subsequent offenses reduce the current value by 15 units. Alternatively, each user is given an initial "evil index" of 0 and "eviling" increases that value. If a range of 100 is used, a user's "evil index" may be regarded as a "percentage of evil", up to 100% "evil".

The decay rate for returning a user's modified "evil index" to normal can vary from forum to forum. For example, the decay in chat rooms (where most flaming occurs) may be less than in other forums. Using the example from immediately above, the user's "evil index" may "decay" back to "normal" at the rate of 2 units per hour in, a chat room, but at the rate of 5 units per hour in other forums.

A user may query a forum to determine the rate of "eviling" within the forum as a measure of how much members of the forum "evil" one another. A high rate may indicate that one or more members are misbehaving. The system keeps track of all users participating in a forum, so the current "eviling" rate is a time-weighted average of the number of "eviling" votes cast by the current participants. In an alternative embodiment, a user may query a forum to determine the accumulated value of the "evil index" of all current users. This measures how often the users have misbehaved in the past, and can serve as an estimate of the likelihood that the current users will misbehave in the future. The system keeps track of all users participating in a forum, so the total "evil index" is the sum of the pertinent forum "evil index" for each participant.

In some embodiments, a user who has been "eviled" has a lessened ability to "evil" other users (thus reducing retaliation). However, some online systems implement message types, such as broadcast or multi-cast messages or self-repeating messages, that are more frequently used than other message types to flame or spam other participants. In some embodiments, it may be desirable to allow all users (even those with a modified "evil index", and thus possibly restricted in usage rights) to "evil" the originator of such message types. Such a determination would be made in STEP 306 of FIG. 3 by examining the message type of event I sent by the originating user. The amount of modification of such an originator's "evil index" can be set to be greater than for flaming to discourage use of such message types for spamming.

When a user's "evil index" is modified, the user is notified that privileges, such as rate of messaging, have been limited. In one embodiment, a message is sent from the server that contains the user's current "evil index" to the "eviled" user, and optionally includes the current rate of decay back to normal. Such information allows a wide range of feedback to be presented to the user about his or her ability to interact with the online computer system. For example, a graphical "power meter" or "power bar graph" can be used to indicate the "evil index" of the user. For instance, a color-coded bar graph can be divided into (1) a green zone to represent that the user's "evil index" is normal; (2) a yellow zone to represent that the user's "evil index" has been modified slightly; (3) a red zone to represent that the user's "evil index" has been modified significantly; and (4) a black zone to represent that access or message privileges have been suspended for a time. However, other methods of informing a recalcitrant user of his or her "evil index" can be used.

In one embodiment, a user can "rehabilitate" his or her "evil index" by visiting advertisements displayed on the online computer system; "visits" can be determined by requiring the user to "click" on an advertisement. The user is rewarded with more "power" by adjusting the value of the user's "evil index" more towards normal.

Automatic Rate Limiting

In one embodiment, both input and output messaging rates of a user are limited based on the behavior of the user and/or available system resources. Such rate limiting can stop malicious users and errant client computers from consuming more than a fair share of online system resources. However, preferably the rate limiting system is weighted to tolerate brief bursts of messaging activity while penalizing unacceptably large rates of messaging. Rate limiting can also limit aggregate input to a server to a level at which the system is reasonably loaded under normal conditions. Rate limiting can also be combined with "eviling" by automatically adjusting a users rate limit parameters based on their "evil index."

In one embodiment, input rate limiting—from user to server—is conducted on a per user connection basis, and within a user connection on a per-message type bases (that is, rate limits for different types of messages may be set to different values). In one embodiment, rate limiting for a user is achieved in accordance with the following algorithm:

1) Define A as the running average of inter-message time gaps for the last N messages of selected types that the user has attempted to send; a system selected value I is used as the first value for A. Calculation of A can be done, for example, on a forum basis (accounting only for messages sent in the current forum), session basis (accounting for messages sent in the user's current online session), or message-count basis (accounting for the last N messages sent at any time in any forum).
2) If A is below a warning threshold W (indicating that the user is approaching a point of sending messages too frequently), when the user attempts to send a message, send the user a warning message but transmit the user's message.
3) If A is below a rate limit threshold R (indicating that the user is sending messages too frequently) when the user attempts to send a message, send the user a warning message and drop the user's message.
4) Repeat the above steps until A rises above a clear threshold C (indicating that the user is not sending messages too frequently), at which time the rate limiting condition is considered cleared.
5) If at any time A drops below a disconnect threshold D, disconnect the user.

Figure 4:
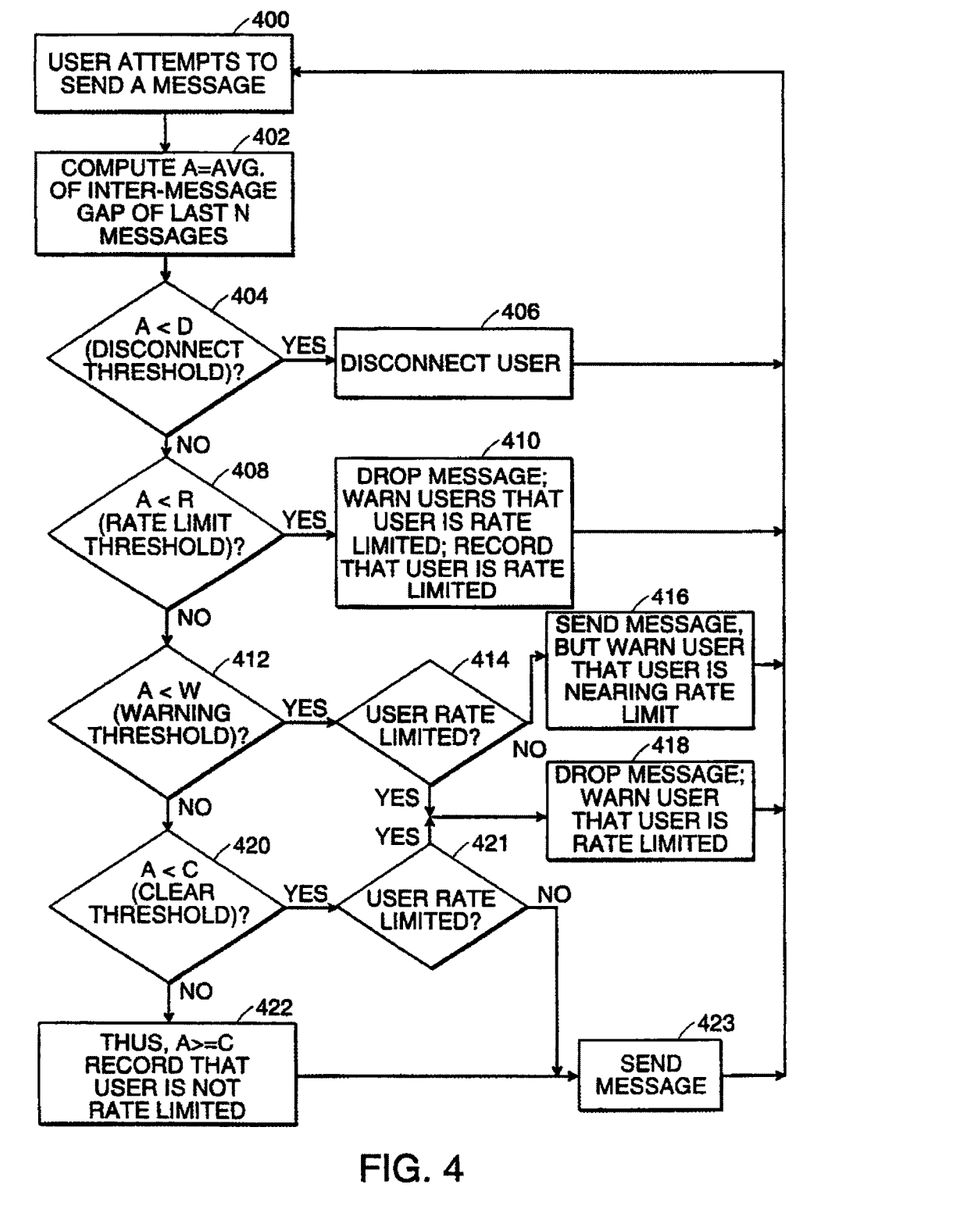
FIG. 4 is a flowchart of a basic embodiment of the rate-limiting aspect of the invention.

FIG. 4 is a flowchart of a basic embodiment of the rate-limiting aspect of the invention, showing a slightly different order for the steps described above. A user attempts to send a message (STEP 400). Average A is computed (STEP 402). If A is less than a disconnect threshold D (STEP 404), the user is disconnected (STEP 406). Otherwise, if A is less than a rate limit threshold R (STEP 408), the message is dropped, the user is warned that the rate limited has been exceeded, and the user is flagged as "rate limited" (STEP 410). Otherwise, if A is less than a warning threshold W (STEP 412), a determination is made as to whether the user is rate limited (STEP 414).

If not, the message is sent, but the user is warned that the rate limit is being approached (STEP 416). Otherwise, the message is dropped and the user is warned that the rate limited has been exceeded (STEP 418).

If A is not less than the warning threshold W (STEP 412), and A is less than a clear threshold C (STEP 420), a determination is made as to whether the user is rate limited (STEP 421). If not, the message is sent (STEP 423). Otherwise, the message is dropped and the user is warned that the rate limited has been exceeded (STEP 418).

Finally, if A is not less than the clear threshold C (STEP 420), the rate limit flag for the user is cleared (STEP 422) and the message is sent (STEP 423).

The rate limiting algorithm supports several "tunable" parameters:

The running average of inter-message time gaps—A
The number of message receptions over which A is calculated—N
An initial average—I
A clear threshold—C
A warning threshold—W
A rate limit threshold—R
A disconnect threshold—D In one embodiment, the values for C, W, R, and D are selected such that C>W>R>D. The initial average rate I can be weighted to increase the algorithm's tolerance of bursts of activity, such as "chatty startups" when a user joins a forum and sends several messages in succession. The threshold rates can be set globally for all user's, or "tuned" for each user.

In one embodiment, the difference between the clear threshold C and the rate limit threshold R can be "tuned" by the online computer system to alter the interval between commencement of rate limiting for a user and the resumption of normal activity. The difference between C and R may be automatically increased, for example, if the user sends excessive "spamming" type messages at too great a rate. Further, the threshold values C, W, R, and D can be dynamically modified by the online system as a way of limiting system resource usage if too many users are simultaneously using the system.

As noted above, when a user's message rate is limited, the user is notified. In one embodiment, a message is sent from the server to a rate limited user that contains values for each of the parameters outlined above, and another message is sent the next time that the server will accept messages from the user without restriction. Such information allows a wide range of feedback to be presented to the user about his or her ability to interact with the online computer system. For example, a graphical "power meter" or "power bar graph" can be used to indicate the "health" or "power" of the user. For instance, a color-coded bar graph can be divided into (1) a green zone to represent that no rate limiting is in effect; (2) a yellow zone to represent that the user's message rate is near the point where rate limiting would take effect; (3) a red zone to represent that message rate limiting is in effect; and (4) a black zone to represent that access privileges have been suspended for a time. However, other methods can be used to inform a recalcitrant user of his or her message rate limit status.

In one embodiment, a user can "rehabilitate" his or her message rate limit status by visiting advertisements displayed on the online computer system. The user is rewarded with more "power" by adjusting the parameters.

In one embodiment, output rate limiting—from server to user—is performed in a similar manner, with the following differences:

1) The system server audits the rate of outgoing error messages of selected types (e.g., RATE_TO_HOST), and uses the above rate limiting algorithm with R=D, to prevent excessive load due to handling users that are generating rate errors.
2) The system server can limit the rate of outgoing messages of selected types (e.g., those types that may be used for spamming) using the above rate limiting algorithm when A<R. In this case, a notice message can be sent to the user, to the user's intended recipient, and to a server storing the user's "evil index". The intended recipient can "evil" the sending user, or the system server can automatically modify the user's "evil index" based on the sending of excessive "spamming" type messages at too great a rate.

The algorithms described above prevent abuse of online system resources without causing undue "pain" to users, including "power users" and users who are subject to delays and input/output timing changes by non-ideal networks (which can cause otherwise normal user activity to appear to be unacceptable activity).

Rate Limiting and "Eviling"

The concepts of automatic rate limiting and modification of a user's "evil index" can be combined to provide a refined self-policing, automatic rate limiting system that can regulate an "eviled" user's ability to participate in forums without requiring total exclusion from the forum. Further, a user's current global or forum "evil index" can be used to modify the parameters used to effect automatic (i.e., "non-eviled" basis) rate limiting for the user. For example, a user's ability to interact in a forum can be rate limited by modifying the values for A, C, W, R, and/or D as a function of whether the user's "evil index" has been modified, or as a function of the current value of the user's "evil index". Conversely, the amount of modification of a user's "evil index" can be a function of the current value of A. Thus, conceptually, a user's permitted message rate $R_p$ is a function of the user's "evil index" EI plus the user's rate of attempted message activity A: $R_p=f(EI)+g(A)$ Conceptually, each user's user-record thus may look like the following table:

| Forum ID | "evil index" | decay rate | # times "eviled" | # times "eviled" others | time-of-entry | total-time of-access | A | C | W | R | D |
|---|---|---|---|---|---|---|---|---|---|---|---|
| Global value | | | | | | | | | | | |
| Forum 1 value | | | | | | | | | | | |
| Forum 2 value | | | | | | | | | | | |
| etc. | | | | | | | | | | | |

Separate "lifetime" and "session" records may be kept where useful. Of course, other or different information may be recorded for each user, and other ways of organizing such data may be used. Further, users may be assigned a "class" designation (such as "sysop" (system operator), corporate users, paying members, non-paying members, etc.) which can be given weight in making a determination of right to "evil" or absolute or relative immunity from being "eviled" in STEP 306 of FIG. 3.

In setting rate parameter values for a user, a global rate table can be used which is indexed by a user's "evil index"; that is, message rate parameters are a function of the user's global or forum "evil index". A conceptual example of one such table might be the following (ΔA represents an optional adjustment to be applied to the calculated value of A):

| "evil index" value | ΔA | C | W | R | D |
|---|---|---|---|---|---|
| 0-20 | | | | | |
| 21-40 | | | | | |
| 41-60 | | | | | |
| 61-80 | | | | | |
| 81-90 | | | | | |
| 91-95 | | | | | |
| 96-100 | | | | | |

The values for A, C, W, R, and D in this table can be defined globally or by forum. If by forum, the values can be defined in absolute terms or as relative offsets to a global table. Multiple tables of this form also can be defined, indexed by message type, so that misuse of certain types of messages are punished more than misuse of other message types.

Alternatively, a non-tabular implementation could be used instead of the global rate table described above. For example, a user's rate parameter values (ΔA, C, W, R, D) could be defined as a function describing a relation between these quantities.

Implementation

The methods and mechanisms described here are not limited to any particular hardware or software configuration, but rather they may find applicability in any computing or processing environment used in connection with online computer services.

The invention may be implemented in hardware or software, or a combination of both. However, preferably, the invention is implemented in computer programs executing on programmable computers each comprising at least one processor, at least one data storage system (including volatile and non-volatile memory and/or storage elements), at least one input device, and at least one output device. Program code is applied to input data to perform the functions described herein and generate output information. The output information is applied to one or more output devices, in known fashion.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage media or device (e.g., ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. Accordingly, other embodiments are within the scope of the following claims.

What is claimed is:

1. A method comprising:
    generating, by a computer system, an average message rate for messages originated by an active user that is one of a plurality of users of a computer-based service, wherein the average message rate is derived from inter-message time gaps of the messages of the active user;
    assessing user activity of the active user based on the average message rate without human intervention; and
    providing notification to at least the one active user of the computer-based service, from the computer system, without human intervention, of an effect of the average message rate on the active user's privileges in the computer-based service.

2. The method of claim 1, further comprising implementing the effect of the average message rate on the active user's privileges in the computer-based service.

3. The method of claim 1, wherein providing notification comprises providing notification without human intervention after the assessing of the user activity.

4. The method of claim 1, wherein providing notification comprises providing notification without human intervention after the effect is implemented.

5. The method of claim 1, wherein the effect of the average message rate on the active user's privileges in the computer-based service comprises an effect on the active user's ability to continue to access the computer-based service.

6. The method of claim 1, wherein the effect of the average message rate on the active user's privileges in the computer-based service comprises an effect on the active user's ability to send messages using the computer-based service.

7. An apparatus comprising a non-transitory computer-readable medium having instructions stored thereon for providing notification to a user that when executed by a machine processor result in at least the following:
    generating an average message rate for messages originated by an active user that is one of a plurality of users of a computer-based service, wherein the average message rate is derived from inter-message time gaps of the messages of the active user;
    assessing activity of the active user based on the average message rate without human intervention; and
    providing notification to at least the active user of the computer-based service, without human intervention, of an effect of the average message rate on the active user's privileges in the computer-based service.

8. The apparatus of claim 7, further comprising instructions, that when executed, result in implementing the effect of the average message rate on the active user's privileges in the computer-based service.

9. The apparatus of claim 7, wherein providing notification comprises providing notification without human intervention after the assessing of the user activity.

10. The apparatus of claim 7, wherein providing notification comprises providing notification without human intervention after the effect is implemented.

11. The apparatus of claim 7, wherein the effect of the average message rate on the active user's privileges in the computer-based service comprises an effect on the active user's ability to continue to access the computer-based service.

12. The apparatus of claim 7, wherein the effect of the average message rate on the active user's privileges in the computer-based service comprises an effect on the active user's ability to send messages using the computer-based service.

13. A system comprising:
    at least one computer; and
    at least one non-transitory computer-readable medium coupled to the at least one computer having instructions stored thereon which, when executed by the at least one computer, cause the at least one computer to perform operations comprising:
        generating an average message rate for messages originated by an active user from a plurality of users of a computer-based service, wherein the average message rate is derived from inter-message time gaps of the messages of the active user;
        assessing activity of the active user based on the average message rate without human intervention; and
        providing notification to at least the one active user of the computer-based service, without human intervention, of an effect of the average message rate on the active user's privileges in the computer-based service.

14. The system of claim 13, wherein the operations further comprise implementing the effect of the average message rate on the active user's privileges in the computer-based service.

15. The system of claim 13, wherein providing notification comprises providing notification without human intervention after the assessing of the user activity.

16. The system of claim 13, wherein providing notification comprises providing notification without human intervention after the effect is implemented.

17. The system of claim 13, wherein the effect of the average message rate on the active user's privileges in the computer-based service comprises an effect on the active user's ability to continue to access the computer-based service.

18. The system of claim 13, wherein the effect of the average message rate on the active user's privileges in the computer-based service comprises an effect on the active user's ability to send messages using the computer-based service.

19. The system of claim 13, wherein the effect of the average message rate on the active user's privileges in the computer-based service comprises an effect on the active user's ability to access the computer-based service.

20. The system of claim 13, wherein generating the average message rate for messages originated by the active user of the computer-based service comprises computing the average message rate for messages originated by the active user of the computer-based service.

* * * * *